United States Patent [19]

Chester

[11] 4,197,334

[45] Apr. 8, 1980

[54] METHOD FOR FORMING A CONDUCTIVE CERAMIC GLAZE

[75] Inventor: Victor Chester, Allentown, N.J.

[73] Assignee: General Porcelain Manufacturing Company, Trenton, N.J.

[21] Appl. No.: 39,228

[22] Filed: May 14, 1979

Related U.S. Application Data

[62] Division of Ser. No. 911,007, May 30, 1978.

[51] Int. Cl.$^2$ .............................................. H01B 1/08
[52] U.S. Cl. ................................. 427/133; 249/114 R; 264/61; 264/40.1; 324/54; 106/38.27; 106/60; 106/62
[58] Field of Search .................. 249/114; 427/133; 252/519, 521; 106/38.27, 38.3, 38.9, 48

[56] References Cited

U.S. PATENT DOCUMENTS 2,297,837  10/1942  Loughnane ............................ 324/54

*Primary Examiner*—Sam Silverberg

*Attorney, Agent, or Firm*—John J. Kane; Frederick A. Zoda; Albert Sperry

[57] ABSTRACT

A method for forming an electrically conductive glaze upon the outer surface of a ceramic mold form including the mixing of approximately 25 percent potash feldspar, approximately 22 percent flint, approximately 7 to 8 percent calcium carbonate, approximately 1 to 2 percent ball clay, approximately 2 to 4 percent kaolin, approximately 5 percent barium carbonate and approximately 35 percent red iron oxide, all percentages being taken by weight, the method including the addition of an amount of flocculent such as 20 percent magnesium sulfate solution to control the viscosity of the solution and thereby control the thickness of the layer formed upon the external surface of the ceramic mold form, also including preferably the spraying or dipping of the mold form in the resulting solution for coating thereof as well as the firing of the coated ceramic mold form in a furnace of approximately 2200 to 2300 degrees Fahrenheit for approximately a 30 hour cycle.

6 Claims, No Drawings

METHOD FOR FORMING A CONDUCTIVE CERAMIC GLAZE

This is a division of U.S. Ser. No. 911,007 filed May 30, 1978, presently pending.

BACKGROUND OF THE INVENTION

1. Field of the Invention

In the handling of chemicals and other dangerous substances, it is desirable to use special rubber gloves which are manufactured without imperfections. The present invention provides a means for forming an electrically conductive surface on a mold which is usable to form such gloves thereon.

It is usual that ceramic molds are used as the form about which the rubber is placed for making these high quality gloves. The present method is usable for a glaze about the external surface of such a ceramic mold which glaze itself is electrically conductive to facilitate the monitoring for imperfections of the gloves formed thereon. Also the conductive surface serves to increase the flow of heat to the glove to facilitate curing thereof.

In practice a glove will be formed about a ceramic mold having the conductive glaze formed by the present invention therearound. And then prior to removal of the glove from the form, the form and the glove as a unit may be dipped in an electrolytic solution such that the conductive glaze itself will act as one electrode and another electrode may be placed in the electrolyte. In another method the glove need not be dipped in an electrolytic solution, but an electrode may be manually or otherwise caused to pass over the surface of the glove and visual arcing or a surge reading on a voltage or current meter will indicate an imperfection. In either system application of a voltage difference across the two electrodes will cause electrical current to flow between the electrodes only if an imperfection exists in the wall of the gloves at any point such that electric current may flow therethrough. However if the glove is indeed a perfect glove having no apertures therethrough or pinholes the flow of current between the electrodes will be prevented. In this manner a glove can be tested for imperfections in a one-step process without requiring the removal of the glove from the mold form and the placing of the glove in a special test apparatus.

2. Description Of The Prior Art

The main problem existing in the prior art in the forming of electrically conductive glazes for ceramic mold forms has been the lack of consistency of resistivity between one fired glaze and the next fired glaze. It is desirable to use a ceramic glaze having repeatably consistent surface resistivity. The prior art conductive glazes did not have this quality but the method of forming a glaze as disclosed and claimed in the present invention provides a simple means for forming the glaze and, most importantly, provides a repetitive consistency of the surface resistivity of the glaze in the range of 50,000 ohms to 150,000 ohms when the measurement is made at points 1 and 2 inches apart.

Also the components of the glaze of the present invention are reasonably inexpensive as well as easily accessible and in this manner provides further advantages over conductive glazes of the prior art.

Most prior art conductive surfaces on molds are achieved by using electrically conductive coatings rather than using the ceramic itself as the conducting agent. Conductive coatings tend to wear off quickly when not using the present invention but a conductive ceramic glaze has a very extended useful lifetime.

SUMMARY OF THE INVENTION

The present invention provides a method for forming an electrically conductive glaze on the external surface of a ceramic mold form. The main components used in the glazing method include approximately by weight 25 percent feldspar, 22 percent flint, 7 percent calcium carbonate, 2 percent ball clay, 3 percent kaolin, 5 percent barium carbonate and 35 percent red iron oxide.

This overall glazing composition is added to water in an approximate ratio of 5 parts of the original composition to 3 to 5 parts water, or an amount of water is added to cause the resulting solution to assume a specific gravity of 1.52, preferably, or at least within the range of 1.48 to 1.55.

Preferably, the feldspar is a potash feldspar and the flint has been filtered through a #200 mesh filter. This entire composition is then screened by an electric shaker through a #150 mesh followed by the addition of an amount of flocculent such as magnesium sulfate 20 percent solution for adjusting of the viscosity of the final dipping solution. The magnesium sulfate solution is operable to allow the smooth application of the glazing formula to the external surface of the mold form. If necessary a deflocculent can also be utilized to control viscosity.

This coated mold form is now placed in a furnace for firing at a maximum temperature of approximately 2200 to 2300 degrees for a 30 hour cycle to form a black semi-gloss electrically conductive glaze on the external surface of the mold. This method is reproducible to provide a surface resistivity of 50,000 to 150,000 ohms when measured at points 1 and 2 inches apart.

It is the preferred embodiment of the present invention to provide a ceramic mold form having an electrically conductive glaze about the external surface thereof.

It is an object of the present invention to provide an electrically conductive glaze upon the surface of a ceramic mold which is reproducible such that the glaze has a surface resistivity of 50,000 to 150,000 ohms when measured at points 1 and 2 inches apart.

It is an object of the present invention to provide an electrically conductive glazing method resulting in a black semi-gloss finish after firing.

It is an object of the present invention to provide a method for forming an electrically conductive glaze upon the external surface of a ceramic mold form which includes an adjustable viscosity, controllable by the addition of an amount of flocculent or deflocculent to assure smooth flow during application of the glazing material upon the mold form prior to firing.

It is an object of the present invention to provide a method for forming a solution to place an electrically conductive glaze upon a ceramic mold wherein the thickness of the formed glaze is controlled by the adjusting of the specific gravity of the glazing solution.

It is an object of the present invention to provide an electrically conductive composition for glazing a ceramic mold form wherein the specific gravity is adjusted by controlling closely the amount of water added thereto prior to coating of the mold form.

It is an object of the present invention to provide a method for glazing a ceramic mold form including the firing of the coated mold form in a conveniently reproduceable manner to provide a constantly reproduceable surface resistance of the resulting conductive glaze.

It is an object of the present invention to provide a method for forming an electrically conductive glaze on the external surface of a ceramic mold form which is usable with a variety of sizes of mold forms.

It is an object of the present invention to provide an electrically conductive glaze upon a ceramic mold form which is capable of being produced for reasonably low cost.

DETAILED DESCRIPTION OF THE PREFERRED EMBODIMENT

While the invention is particularly pointed out and distinctly claimed in the concluding portions herein, a preferred embodiment is set forth in this detailed description.

The purpose of the method of the present invention is to provide an electrically conductive glaze upon the external surface of a ceramic mold form having a surface resistivity of approximately 50,000 to 150,000 ohms when measured at points 1 and 2 inches apart but which is easily reproducible within these tolerances. The preferred embodiment set forth in this detailed description provides a total material having a weight of 20 pounds and 1 ounce. This material including potash feldspar, flint, calcium carbonate, ball clay, kaolin, barium carbonate and red iron oxide is added to approximately 2 gallons of warm-to-hot water such that the specific gravity of the resulting solution is approximately 1.52. This solution is then adjusted for viscosity by the addition of an amount of flocculent such as magnesium sulphate 20 percent solution. Alternatively, if needed the addition of a deflocculent such as sodium tetrapyrophosphate or sodium silicate could be added. Then the ceramic mold form itself is coated and fired in order to form the final electrically conductive glaze thereon.

Initially each of the ingredients listed below is weighed. The specifics of each of the seven components of the original material are listed in the below table:

| MATERIAL | LBS. | OZS. | PERCENTAGE | PERCENTAGE TOLERANCES BY WEIGHT |
|---|---|---|---|---|
| Feldspar (Potash) | 5 | 4 | 26.2 | 24.0 to 28.0 |
| Flint (200 Mesh) | 4 | 7 | 22.2 | 20.0 to 24.0 |
| Calcium Carbonate | 9.7 | 15 | 9.7 | 5.0 to 10.0 |
| Ball Clay | 0 | 4 | 1.2 | 1.0 to 2.0 |
| Kaolin | 0 | 7 | 2.3 | 2.0 to 4.0 |
| Barium Carbonate | 0 | 14 | 4.4 | 4.0 to 6.0 |
| Red Iron Oxide | 6 | 14 | 34.0 | 30.0 to 36.0 |
|  | 20 | 1 | 100.0 |  |

Initially in this preferred embodiment each of the seven materials listed above is independently weighed. The iron oxide is hold separately and the remaining six ingredients are physically mixed. Initially the iron oxide is added to at least a portion of the 2 gallons of water and mixed. The mixing may be performed by stirring on an electric mixer for approximately 10 minutes or possible ball milling for up to 3 hours. The remaining six ingredients are then added and the entire composition is stirred for one-half hour. Additional water is now added to bring the specific gravity within the limitations of 1.48 to 1.55 but most preferably to exactly 1.52. The exact amount of water finally added can vary within the tolerances and in this manner the final thickness of the coating of material upon the external surface of the ceramic mold is controlled. Generally water will be added in an amount equal to 3 to 5 parts water by weight to 5 parts of the original mixture. With a higher specific gravity the coating will be thicker whereas with a lower specific gravity the coating will be thinner. This adjustment can be made with each run in order to vary the thickness of the final conductive glaze.

This solution now having the desired specific gravity may be screened to a #150 mesh on a shaker such as an electric shaker or the like. Then the viscosity of the solution is adjusted to assure a smooth application flow during the dipping or spraying steps by the addition of an amount of magnesium sulphate 20 percent solution which acts as a flocculent. This solution is added quite sparingly since a few drops will change the viscosity substantially due to chemical reaction with the material. However should deflocculent be needed then a small amount of sodium tetrapyrophospate or sodium silicate may be added.

The now properly dipped or sprayed, wet ceramic mold form will be placed within a furnace for firing. Preferably the firing will be performed in an oxidizing environment wherein the temperature is raised to approximately 2260 degrees Fahrenheit and then down to room temperature over a 30 hour cycle. This will result in a black semi-gloss finish being assumed by the electrically conductive glaze as well as a surface resistivity in the range of 50,000 to 150,000 ohms when measured at points 1 and 2 inches apart.

One of the primary advantages of the method of the present invention is the ability to consistently produce electrically conductive glazes having surface resistivity within the above-defined tolerances. As long as each of the materials is included within the percentage ranges claimed and disclosed in this invention this surface resistivity will be maintained within the described limit. Thus a consistency of resistivity in the resulting glaze is achieved by using the composition disclosed and claimed in the present invention as well as the method disclosed and claimed herein.

While particular embodiments of this invention have been described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:
1. A method for forming an electrically conductive glaze upon a ceramic mold form comprising:
   (a) forming a combination comprising feldspar (24.0–28.0 percent by weight), flint (20.0–24.0 percent by weight), calcium carbonate (5.0–10.0 percent by weight), ball clay (1.0–2.0 percent by weight), kaolin (2.0–4.0 percent by weight), barium carbonate (4.0–6.0 percent by weight), red iron oxide (30.0–36.0 percent by weight);
(b) forming a solution by mixing five parts by weight of said combination with from three to five parts water by weight;
(c) adjusting the viscosity of the solution as desired by adding an amount of flocculent or deflocculent thereto;
(d) applying the solution to the surface of a ceramic mold form; and
(e) heating the coated ceramic mold form to form an electrically conductive glaze thereon.

2. The method as defined in claim 1 wherein said mixing is performed with sufficient water to yield a resulting solution having a specific gravity of from 1.48 to 1.52.

3. The method as defined in claim 1 wherein the heating is performed by the temperature of approximately 2260° F. for a cycle of approximately 30 hours.

4. The method as defined in claim 1 wherein the applying of the solution is performed by dipping of the ceramic mold form therein.

5. The method as defined in claim 1 wherein the applying of the solution is performed by spraying of the ceramic mold form therein.

6. The method as defined in claim 1 further including screening of the solution through a #150 mesh filter after adjusting the specific gravity and prior to the adjusting of the viscosity by adding of the 20 percent magnesium sulfate solution.

* * * * *